UNITED STATES PATENT OFFICE.

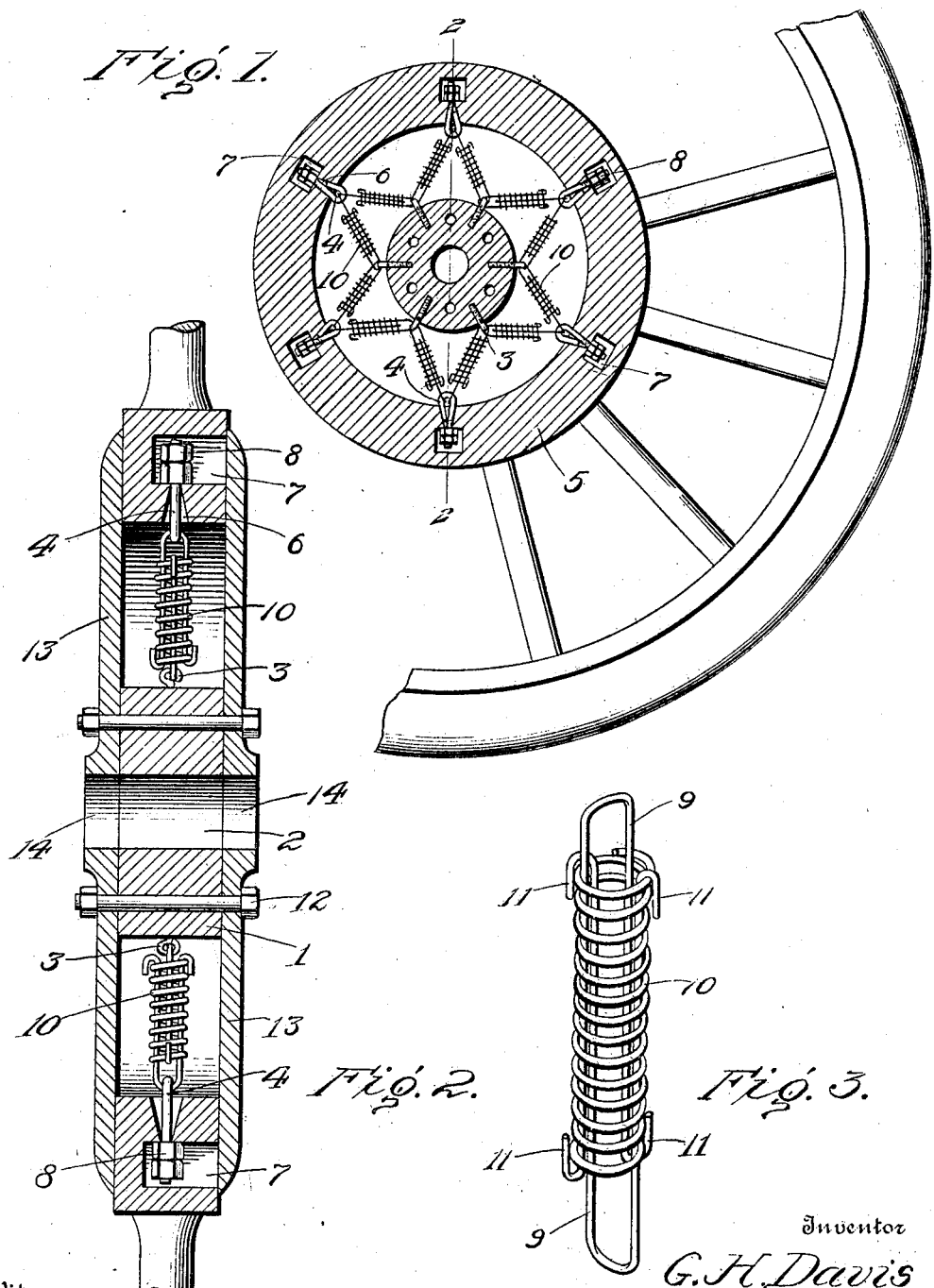

GEORGE H. DAVIS, OF ADVANCE, MISSOURI.

SPRING-HUB.

1,029,429.  Specification of Letters Patent.  Patented June 11, 1912.

Application filed December 22, 1910. Serial No. 598,783.

*To all whom it may concern:*

Be it known that I, GEORGE H. DAVIS, residing at Advance, in the county of Stoddard and State of Missouri, have invented certain new and useful Improvements in Spring-Hubs; and I do hereby declare the following to be a full, clear, and exact description of the invention, such as will enable others skilled in the art to which it appertains to make and use the same.

This invention relates to resilient wheels for vehicles and especially to a spring hub for same, designed to absorb shocks incident to such wheels when passing over rough roads.

The object of the invention is to provide a wheel for automobiles and other vehicles having a resilient hub, thereby permitting the use of solid rubber or inelastic tires on the wheels.

Another object of the invention is to provide a resilient wheel of simple and durable construction, which will be inexpensive to manufacture.

With the above and other objects in view, the invention consists in certain combinations and arrangements of the parts, as will be more fully understood as the description proceeds.

The preferred embodiment of my invention is illustrated in the accompanying drawings, forming a part of this specification, and in which like characters of reference indicate corresponding parts.

Figure 1 is a side elevation illustrating my invention, parts being broken away to more clearly show the construction. Fig. 2 is a sectional view taken on line 2—2 of Fig. 1 and Fig. 3 is an enlarged perspective view of the springs connecting the bushing and ring.

Referring to the drawings 1 represents a bushing having therein an aperture 2 for receiving the axle of a vehicle. Screwed into the periphery of the bushing are a plurality of equally spaced threaded eye-bolts 3, to each of which is connected a pair of springs. The springs from the adjacent eye-bolts 3, incline toward each other forming substantially a V and have their outer ends connected to a plurality of spring eye-bolts 4, secured in a ring 5 which carries the spokes of the wheel. The spring eye-bolts 4 are received by inwardly tapering apertures 6 in the inner periphery of the ring 5, and said apertures terminate in recesses 7 extending transversely through the ring for receiving a pair of nuts 8 on the threaded end of the spring eye-bolts. The springs connected to the eye-bolts 3 and 4, consist of oppositely disposed elongated U-shaped members 9 which pass through coiled springs 10 of proper strength and have at their free ends outwardly turned hooks 11, for engaging the ends of the coil springs.

Rigidly fastened to the ends of the bushing 1, by through bolts 12 or in any suitable manner, are circular plates 13 which overlap the inner periphery of the ring 5 and are provided with apertures 14 alining with the aperture 2 in the bushing.

From the foregoing description taken in connection with the drawings, it is apparent that the weight of the vehicle is supported by the coil springs on the upper side of the bushing, and that the ring is permitted to slide between the circular plates fastened to the ends of the bushing.

Although the elements, shown and described, are well adapted to accomplish the purpose for which they are intended, it is to be understood that slight changes in the form, proportion and minor details of construction may be resorted to without departing from the spirit of the invention.

Having fully described my invention, what I claim and desire to secure by Letters Patent is:—

1. In a spring hub, the combination with a bushing, having a central opening therein, a plurality of radially extending eye bolts removably carried by said bushing, an inner rim spaced from said bushing, said inner rim being provided with a plurality of rectangular depressions in one vertical face thereof, said depressions coöperating with an opening extending from the same to interior surface of the inner rim, said openings being flared toward said bushing, eye bolts mounted in said openings, nuts mounted in said depression upon said eye bolts adapted to adjustably retain the same in said openings, and convergent springs interposed between said eye bolts.

2. In a spring hub, the combination with a bushing, having a central opening therein, a plurality of radially extending eye bolts removably carried by said bushing, an inner rim spaced from said bushing, said inner rim being provided with a plurality of rectangular depressions in one vertical face thereof, said depressions coöperating with an opening extending from the same to interior surface of the inner rim, said opening being flared toward said bushing, eye bolts mounted in said openings, nuts mounted in said depression upon said eye bolts adapted to adjustably retain the same in said openings, and convergent springs interposed between said eye bolts, each eye bolt of the inner rim having two springs secured thereto.

In testimony whereof I affix my signature in presence of two witnesses.

GEORGE H. DAVIS.

Witnesses:
J. R. Croy,
J. L. Davis.